United States Patent [19]

Aurenz

[11] 3,954,546
[45] May 4, 1976

[54] APPARATUS FOR THE MANUFACTURE OF OPTICAL-FIBER BUNDLES

[75] Inventor: Hans-Dieter Aurenz, Rommelsbach, Germany

[73] Assignee: Jenaer Glaswerk Schott & Gen., Mainz, Germany

[22] Filed: Sept. 5, 1974

[21] Appl. No.: 503,300

[30] Foreign Application Priority Data
Sept. 6, 1973    Germany............................ 2344973

[52] U.S. Cl.............................. 156/433; 29/419 G; 156/174; 156/446; 156/475; 350/96 B
[51] Int. Cl.²......................................... B65H 54/00
[58] Field of Search............ 156/169, 170, 173, 174, 156/175, 180, 182, 433, 436, 441, 434, 425, 426, 429, 296, 446, 443; 65/4, DIG. 7; 350/96 B; 242/7, 19, 7.15, 18 G, 7.01, 7.02; 264/1; 29/419, 419 G, 203 MW

[56] References Cited
UNITED STATES PATENTS

| | | |
|---|---|---|
| 2,589,503 | 3/1952 | McCulbugh ...................... 242/7.15 |
| 2,639,870 | 5/1953 | Graham ........................... 242/84.42 |
| 3,549,800 | 12/1970 | Baker............................... 350/96 B |
| 3,559,900 | 2/1971 | Harada et al. ........................ 242/18 |
| 3,585,705 | 6/1971 | Allon ................................. 129/419 |
| 3,741,839 | 6/1973 | Komiya............................. 156/174 |
| 3,772,119 | 11/1973 | Peck .................................. 156/174 |
| 3,793,107 | 2/1974 | Lloyd................................. 156/426 |

*Primary Examiner*—William A. Powell
*Assistant Examiner*—Michael W. Ball
*Attorney, Agent, or Firm*—Littlepage, Quaintance, Murphy & Dobyns

[57] ABSTRACT

An apparatus for the manufacture of optical-fiber bundles comprises a frame, a plate-like rotor having upper and lower parallel surfaces journaled to rotate in the frame about an axis of rotation parallel to the surfaces, a fiber guide mounted in the frame along a line parallel to the axis of rotation of the rotor, means for rotating the rotor, and means for moving the fiber guide coordinately with the rotor such that optical fibers passing through the fiber guide are wound on the rotor in a parallel fan-like manner.

10 Claims, 5 Drawing Figures

APPARATUS FOR THE MANUFACTURE OF OPTICAL-FIBER BUNDLES

BACKGROUND OF THE INVENTION

1. Field of Invention

This invention relates to an apparatus for the manufacture of optical-fiber bundles, and especially to optical-fiber bundles for use in any enlargement devices. Broadly, the invention provides a means for forming fan-shaped optical-fiber layers which when appropriately superimposed form a sqaure pyrimidal optical-fiber bundle.

2. Description of the Prior Art

Compact bundles of filaments or fibers of light-transmitting material have been formed in many shapes by numerous devices to act as light guides for the controlled transmission of light signals and images. Some guides have been produced by repeatedly looping or winding a single continuous filament of light-transmitting material onto a form of the appropriate shape. The filament is often guided onto the form by a guide means which moves with patterned regularity in a direction parallel to the axis of rotation of the form. The relation between the speed of rotation of the form and the transverse movement of the guide is so adjusted to result in the desired pattern of light-transmitting filaments. The filaments are commonly then secured in the resultant pattern by means of a cementitious material placed into the interstices between the individual fibers. Examples of patents directed to this area generally are U.S. Pat. Nos. 3,585,705; 3,586,563; 3,741,839; 3,761,234; and 3,772,119.

SUMMARY OF THE INVENTION

According to this invention, an apparatus for the manufacture of fan-shaped optical-fiber layers comprises a frame, a rotor journaled for rotation in the frame and adapted to receive an optical fiber in a patterned sequence so as to form a fan-shaped optical-fiber layer, a fiber guide mounted in the frame along a line parallel to the axis of rotation of the rotor for guiding the optical fiber onto the rotor, means for rotating the rotor about its axis of rotation, and means for moving the fiber guide coordinately with the rotor such that an optical fiber passing through the fiber guide is wound on the rotor to form a fan-shaped optical-fiber layer.

The frame can comprise any support, foundation, base, stand, body, or chasses appropriately adapted to support an apparatus of this type. The frame can further comprise an axle adapted to receive a rotating member and a slide mounted parallel to the axle and adapted to receive a sliding member which can be periodically and in a patterned fashion moved along the slide parallel to the axle.

The rotor is journaled in the frame for rotation with respect to the frame about an axis of rotation of the rotor and can be mounted on an axle fixed with respect to the frame. The rotor comprises a plate having an upper and a lower surface parallel to one another and parallel to the axis of rotation of the rotor. The rotor also comprises a first and second spacer, each spacer being parallel to the axis of rotation, perpendicular to the upper and lower surfaces, and parallel to each other. The spacers have a series of depressions that are equidistantly-spaced along the length thereof. The depressions are adapted to receive an optical fiber and temporarily maintain the fiber in spaced relation from an adjacent fiber placed in an adjacent depression.

The rotor can also consist of at least one form block removably mounted on the upper or lower surface of the plate. The form block has a reverse surface in intimate contact with the surface of the plate. The reverse surface can include means for removably attaching the form block to the surface of the plate. The obverse surface of the form block, that is the surface on the opposite side of the form block from the reverse surface, is generally saddle-shaped having a plane middle portion and curved side portions. The curved side portions are preferably a smooth, convex chamfer and may take on the shape of a hyperbolic paraboloid making a smooth transition to the plane middle portion. The edge of the curved portion of the form block closest to a spacer mounted on the plate is directed toward the spacer such that an optical fiber extending from the plane middle portion to the spacer would have no discontinuity.

The fiber guide is mounted with respect to the frame parallel to the axis of rotation of the rotor. The fiber guide can have a slide surface in sliding contact with a slide mounted parallel to the axis of rotation of the rotor. The fiber guide has an aperture or opening adapted to receive an optical fiber and direct the fiber to the rotor. The fiber guide is periodically moved parallel to the axis of rotation of the rotor coordinately with the rotation of the rotor by an appropriate means for moving the fiber guide. The means for moving the fiber guide coordinates the motion of the fiber guide and the rotation of the rotor such that an optical fiber is wound on the rotor in a parallel fan-like manner to form a fan-shaped optical-fiber layer. The optical fibers forming the layer lie in a plane and are tangent to each other on the plane middle portion of the form block and are equidistant from each other in the depressions found along the length of the spacer.

A fan-shaped optical-fiber layer is produced by directing a single strand or filament of light-transmitting material from a source of the material through the aperture in the fiber guide to an initial point on the rotor. At least one, and preferably two, form blocks are selected and each form block mounted approximately in the center of the upper and lower surface of the plate with the curved portions of the form blocks directed to the spacers. The rotor is then caused to rotate about its axis of rotation and the fiber guide to move coordinately with the rotation of the rotor such that the optical fiber passing through the fiber guide is directed in turn from a first depression in a first spacer to a first form block mounted on the upper surface of the plate to a first depression in the second spacer to a second form block mounted on the lower surface of the plate (if the second form block is used) to a second depression in the first spacer adjacent to the first depression in the first spacer to the first form block and so forth in such a manner that a plurality of fan-shaped optical fiber patterns consisting of a single layer of optical fibers will be formed on the rotor, the optical fibers lying in a plane just touching each other in the plane middle portion of the form block and being positioned equidistant from each other at the edges of the rotor.

After completing the distribution of the fibers to form the fan-shaped optical-fiber layer, the fibers are cemented to each other and fixed in relation to one another by a cementitious material preferably having an index of refraction significantly less than that of the light-transmitting material forming the fibers or filaments. After the fibers have been secured to one another, the fibers are then cut in a plane normal to the direction of the fibers along a line in the middle of the plane middle portion of the form block and on the spacer.

Form blocks having different heights or thicknesses can be used to achieve different angular relationships between that portion of the optical fibers lying on the plane middle portion of the form block and that portion of the optical fibers between the spacer and the edge of the curved portion of the form block. By utilizing form blocks of different heights fan-shaped optical-fiber layers can be produced having a wide range of angular relationships.

A plurality of the fan-shaped optical-fiber layers so produced can be assembled to form a rectangular or cone-shaped pyramidal optical-fiber bundle.

DESCRIPTION OF THE PREFERRED EMBODIMENT

Figure 1:
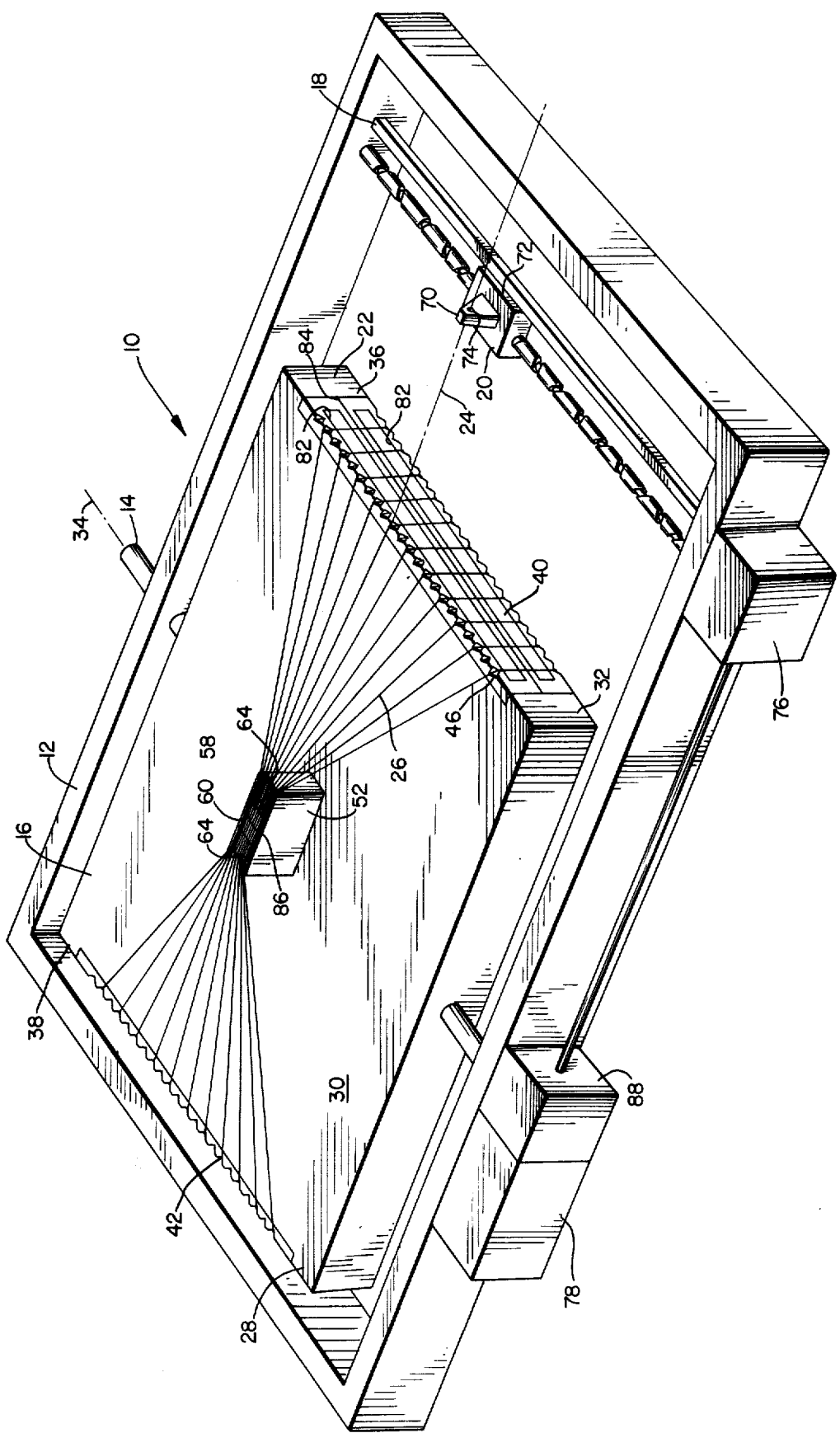
FIG. 1 is a perspective view of an apparatus for the manufacture of optical fiber-bundles according to this invention.

An apparatus for the manufacture of fan-shaped optical fiber layers, shown in FIG. 1 generally as 10, comprises a frame 12 including an axle 14 adapted to receive a rotating member 16 and a slide 18 mounted parallel to the axle 14 and adapted to receive a sliding member 20 which can move along the slide 18 parallel to the axle 14.

The rotating member 16 comprises a rotor 22 journaled for rotation in the frame 12 and adapted to receive an optical fiber 24 in a patterned sequence so as to form a fan-shaped optical fiber layer 26. The rotor 22 comprises a plate 28 having an upper surface 30 and a lower surface 32 parallel to one another and parallel to the axis of rotation 34 which is preferably coincident with axle 14. On a first end 36 and second end 38 of plate 28 are mounted a first spacer 40 and second spacer 42 respectively such that the first and second spacer 40 and 42 respectively are parallel to the axis of rotation 34 and perpendicular to the upper and lower surfaces 30 and 32 of plate 28 and parallel to each other.

Figure 5:
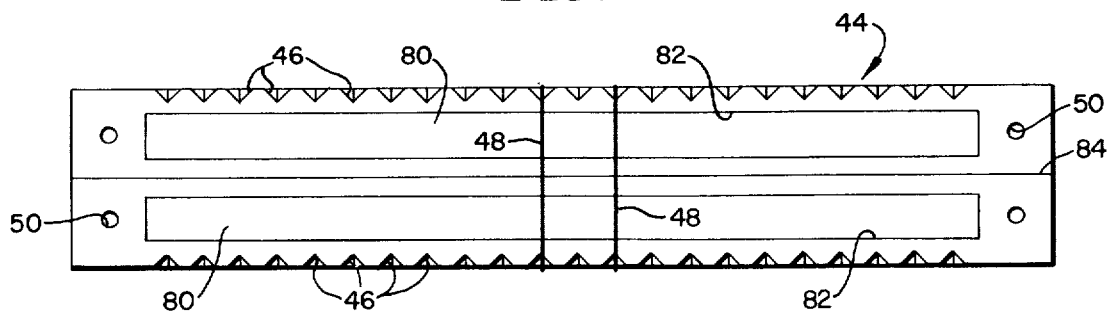
FIG. 5 is an elevation view of the spacer shown in FIG. 1.

The spacers shown in detail in FIG. 5 as 44 have a series of depressions 46, the depressions adapted to receive a series of optical fibers 48 and maintain the fibers 48 in spaced relation from each other. The spacer can include means 50 for securing the spacer to rotor 22.

Figure 3:
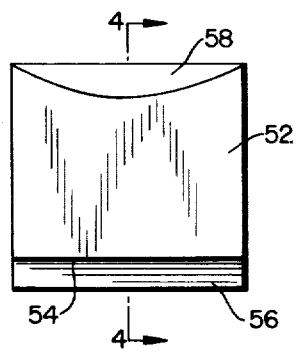
FIG. 3 is an end view of the form block shown in FIG. 1.
Figure 4:
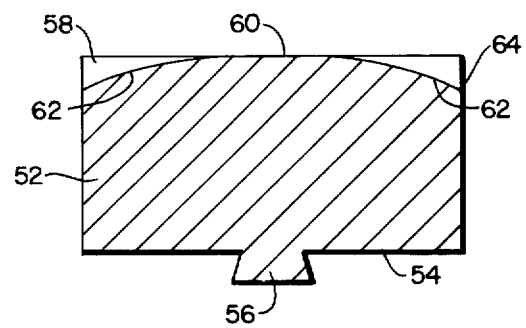
FIG. 4 is a sectional view of the form block of FIG. 3 cut along line 4—4.

The rotor 22 also comprises at least one and preferably two form blocks shown in FIG. 1 as 52 removably mounted on the surface 30 (and surface 32) of the plate 28. The form block 52 shown in an end view in FIG. 3 and in section in FIG. 4 has a reverse surface 54 adapted to contact the surface 30 or 32 of plate 28. The reverse surface can include means 56 for removably attaching the form block 52 to the surface 30 or 32 of plate 28. The obverse surface 58 is generally saddle-shaped having a plane middle portion 60 and curved side portions 62. The edge 64 of the curved portions 62 of the form block 52 which is closest to a spacer 40 or 42 mounted on plate 28 is directed toward the spacer 40 or 42 such that an optical fiber 24 extending from the plane middle portion 60 of form block 52 to the spacer 40 or 42 would have no discontinuity or sharp bend at edge 64.

Figure 2:
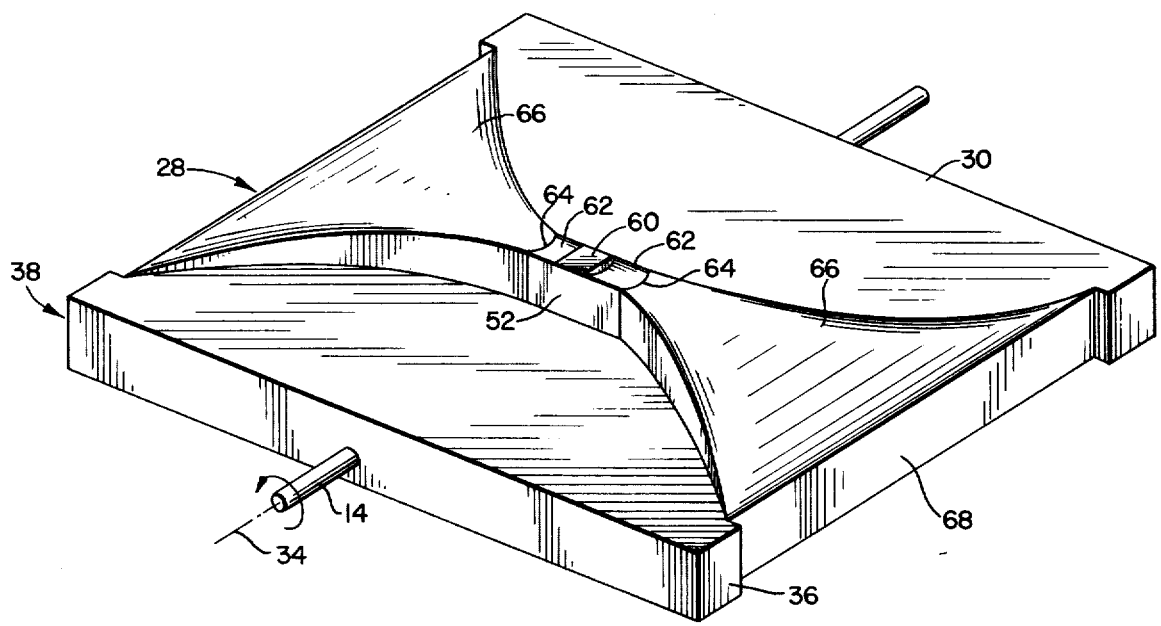
FIG. 2 is a perspective view of the rotor plate of the apparatus shown in FIG. 1 including optional form block extensions.

As shown in FIG. 2, plate 28 adapted to rotate about the axis of rotation 34 coincident with axle 14 has an upper surface 30 upon which is mounted a form block 52 having a plane middle portion 60 and curved side portions 62. In order to ensure that an optical fiber 24 does not experience a sharp discontinuity at edge 64, form block extensions 66 can be removably attached to surface 30 (and surface 32), the form block extensions extending from the edge 64 of the form block to the end 36 and 38 of plate 28. Each end of plate 28 parallel to the axis of rotation 34 include a recess 68 adapted to receive spacer 44.

Sliding member 20 consists of a fiber guide 70 which can have a sliding surface 72 in contact with slide 18 mounted parallel to the axis of rotation 34 of the rotor 22. The fiber guide 70 has an aperture 74 adapted to receive optical fiber 24 and direct the fiber to the rotor 22. The fiber guide 70 is periodically moved parallel to the axis of rotation 34 by means 76 for moving the fiber guide coordinately with the rotor. A means for rotating the rotor 78 rotates the rotor about its axis 34 and in concert with means 76 moves the fiber guide coordinately with the rotor such that an optical fiber 24 passing through the fiber guide 70 is wound on rotor 22 to form the fan-shaped optical fiber layer 26.

For optimum use of an apparatus of this type, a form block 52 of the particular height desired would be mounted on both the upper surface 30 and the lower surface 32 of plate 28. Each form block when centrally positioned on the plate acts to displace the optical fibers from the surface of the plate by receiving a layer of fibers on the obverse surface 58 of form block 52. In this manner, with each layer of fibers deposited on rotor 22, four fan-shaped optical-fiber bundles 26 are produced. The fibers 24 are cemented together in the region of the plane middle portion 60 of form block 52 and are cemented to strips 80 preferably of plate glass which are removably positioned in openings 82 of spacer 44. The optical fibers are then cut along line 84 on spacer 44 normal to the direction of optical fibers 48. The optical fibers are also cut along a line 86 in the middle of the plane middle portion 60 of form block 52 again normal to the optical fibers. In this manner, four fan-shaped layers of optical fibers with their ends securely cemented in position can be removed from the rotor and appropriately positioned for use in the controlled transmission of light signals and images. The complex relative motions of the rotor and fibre guide are controlled by means 88 for coordinating the motion of the fibre guide with that of the rotor.

What is claimed is:

1. An apparatus for the manufacture of fan-shaped optical-fiber bundles, said apparatus comprising:
   A. a frame,
   B. a rotor journaled for rotation in the frame, said rotor comprising, 1. a plate having upper and lower surfaces parallel to one another and parallel to the axis of rotation of the rotor,
2. at least one spacer mounted on the plate perpendicular to the upper and lower surfaces of the plate and parallel to the axis of rotation of the plate, the spacer having a series of depressions therein spaced along the length thereof adapted to receive an optical fiber, and
3. at least one form block mounted on a surface of the plate having a saddle-shaped surface raised from the surface of the plate adapted to displace an optical fiber from the surface of the plate, C. a fiber guide movably mounted with respect to the frame for movement parallel to the axis of rotation of the rotor, D. means for rotating the rotor about its axis of rotation, and E. means for moving the fiber guide coordinately with respect to the rotor such that an optical fiber guided by the fiber guide is wound on the rotor in a parallel fan-like manner.

2. The apparatus of claim 1 wherein said form block is removably mounted on a surface of the plate and further comprises a reverse surface in intimate contact with the surface of the plate including means for removeably attaching the form block to the plate.

3. The apparatus of claim 1 wherein the saddle-shaped surface of the form block further comprises a surface having a plane middle portion and curved portions adapted to smoothly deflect an optical fiber from the surface of the plate.

4. An apparatus for the manufacture of fan-shaped optical-fiber bundles said apparatus comprising:

A. a frame,

B. a rotor journaled for rotation in the frame, said rotor comprising
1. a plate having an upper and a lower surface parallel to one another and parallel to the axis of rotation,
2. a first and second spacer mounted on the plate parallel to each other and to the axis of rotation and perpendicular to the upper and lower surfaces of the plate, each spacer comprising a series of depressions equidistantly spaced along the length thereof, the depressions being adapted to receive an optical fiber, and
3. a first and second form block removeably mounted on the upper and lower surface of the plate respectively, each form block comprising a reverse surface in intimate contact with a surface of the plate including means for attaching the form block to the plate and an obverse saddle-shaped surface having a plane middle portion and curved portions in the direction of said spacers adapted to smoothly deflect an optical fiber from the plane middle portion to the spacers, C. a fiber guide moveably mounted with respect to the frame for motion parallel to the axis of rotation of the rotor, D. means for rotating the rotor about its axis of rotation, and E. means for moving the fiber guide coordinately with respect to the rotor such that an optical fiber guided by the fiber guide is wound on the rotor to form a fan-shaped optical fiber layer, the optical fibers lying in a plane and tangent to the adjacent fibers on the form block and being positioned equidistant from the adjacent fibers on the spacers.

5. The apparatus of claim 4 wherein the spacers further comprise openings adapted to receive strips of glass to which the optical fibers wound on the rotor are cemented to retain the optical fibers in equidistantly spaced relation.

6. The apparatus of claim 4 wherein the curved portions of the obverse saddle-shaped surface are convex chamfer portions approximating a hyperbolic paraboloid.

7. The apparatus of claim 4 further comprising fan-shaped form block extensions mounted on the surfaces of the plate and extending from the form block to the spacer.

8. The apparatus of claim 4 wherein said spacers are removably attached to said rotor and further comprise means for securing the spacer to the rotor.

9. The apparatus of claim 4 wherein the fiber guide further comprises an aperture adapted to receive an optical fiber and direct the fiber to said rotor.

10. An apparatus for the manufacture of fan-shaped optical-fiber layers, said apparatus comprising:

A. a frame comprising:
1. a rectangular-frame member,
2. an axle mounted within the rectangular-frame member, and
3. a slide mounted within the rectangular-frame member spaced from and parallel to the axle, B. a rotor journaled within the frame with an axis of rotation of the rotor being coincident with said axle, said rotor comprising:
1. a plate comprising:
   a. an upper and a lower surface parallel to the axis of rotation and parallel to each other,
   b. a first and a second spacer, each spacer parallel to the axis of rotation, perpendicular to the upper and lower surfaces, and parallel to each other,
   c. said spacers having depressions therein equidistantly-spaced along the length thereof, said depressions being adapted to receive an optical fiber,
2. a first and a second form block removably mounted on the upper surface and the lower surface of said plate respectively, said form blocks each comprising:
   a. a reverse surface in intimate contact with a surface of the plate including means for attaching the form block to the plate, and
   b. an obverse saddle-shaped surface having
      i. a plane middle portion, and
      ii. convex chamfer portions in the direction of said spacers adapted to smoothly deflect an optical fiber from the plane middle portion to said depressions in the spacers, each convex chamber portion extending from said plane middle portion to said spacer,
   c. a fiber guide mounted on said slide parallel to the axis of rotation of the plate comprising
   1. a slide surface in sliding contact with said slide, and
   2. an aperture adapted to receive an optical fiber and direct the fiber to said rotor,
   d. means for rotating the rotor, and
   e. means for moving the fiber guide along the slide including coordinating means for coordinating the motion of the fiber guide and the rotor such that an optical fiber attached to the first spacer at an extreme end thereof will be guided from the spacer to a form block and then to an extreme portion of the second spacer.

* * * * *